Jan. 14, 1947. A. AEPPLI 2,414,283
GEAR CUTTING MACHINE FOR SPUR AND SCREW GEARS
Filed Dec. 6, 1944 4 Sheets-Sheet 1

INVENTOR.
Albert Aeppli
by Sommers + Young
Attorneys

Jan. 14, 1947.  A. AEPPLI  2,414,283
GEAR CUTTING MACHINE FOR SPUR AND SCREW GEARS
Filed Dec. 6, 1944  4 Sheets-Sheet 2
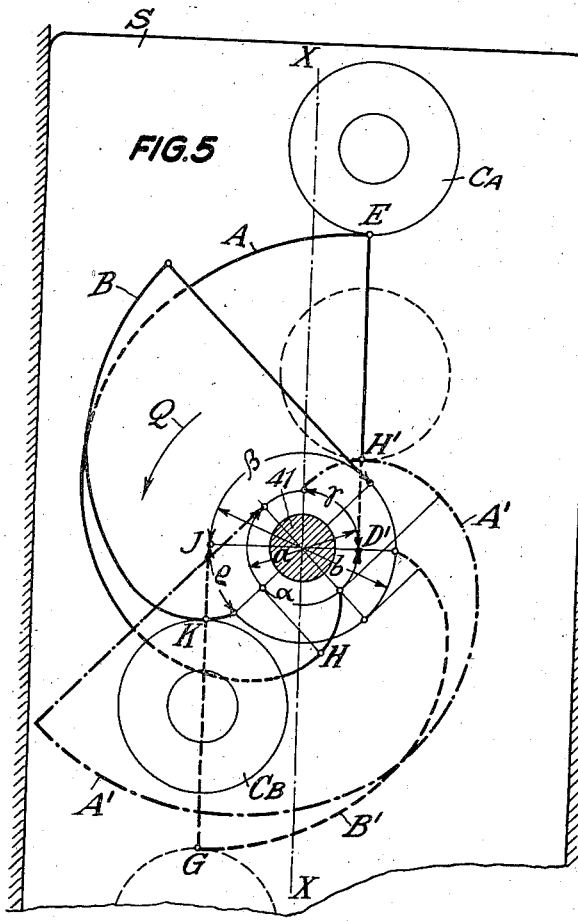
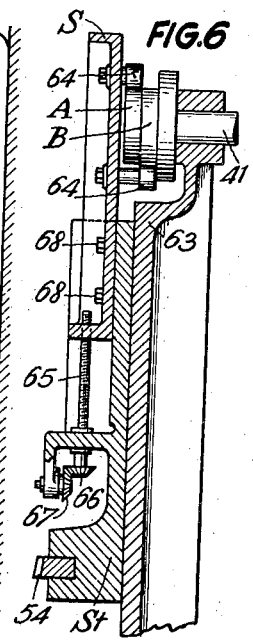
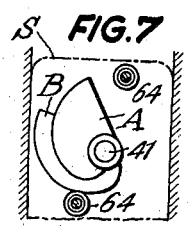
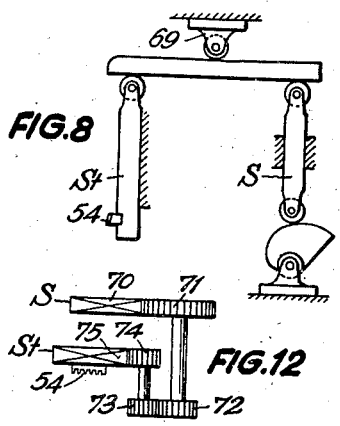
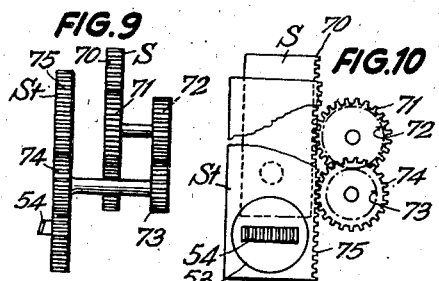
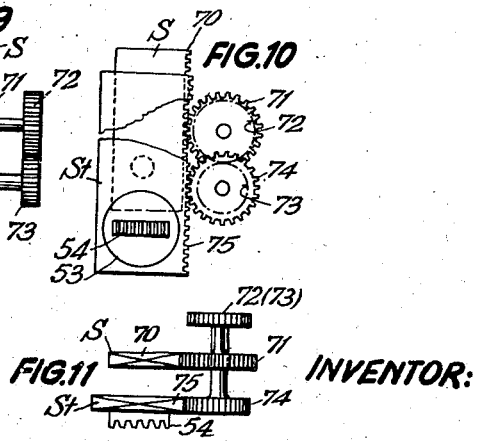
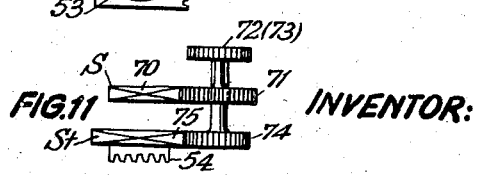
INVENTOR:
Albert Aeppli
by Sommers + Young
Attorneys

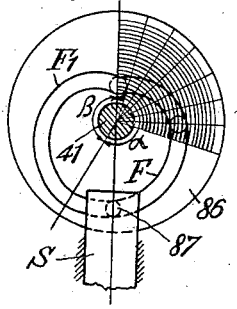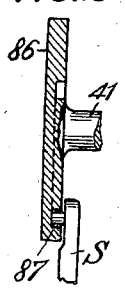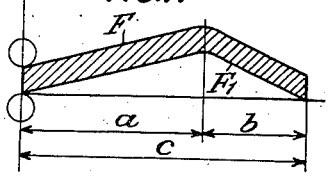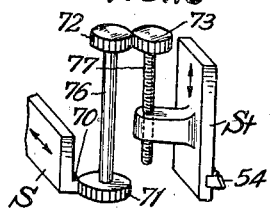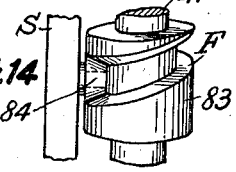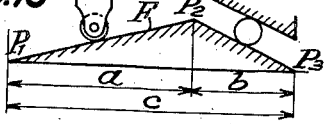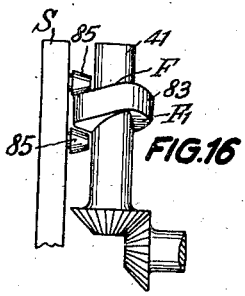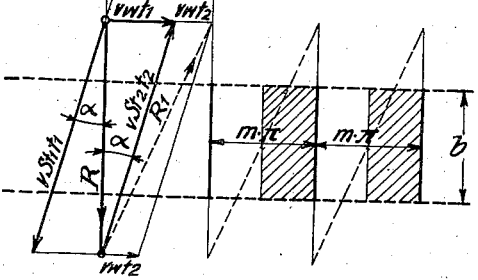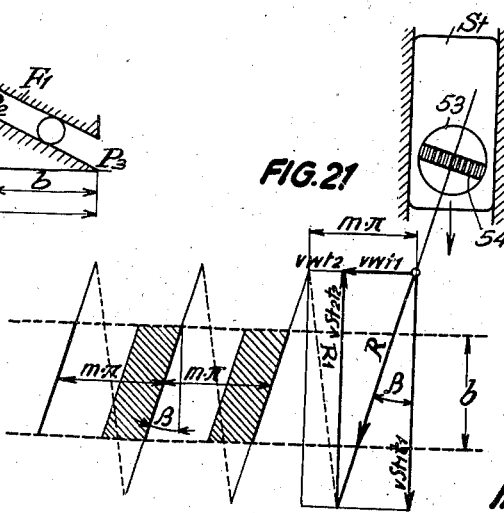

Jan. 14, 1947.    A. AEPPLI    2,414,283
GEAR CUTTING MACHINE FOR SPUR AND SCREW GEARS
Filed Dec. 6, 1944    4 Sheets-Sheet 4
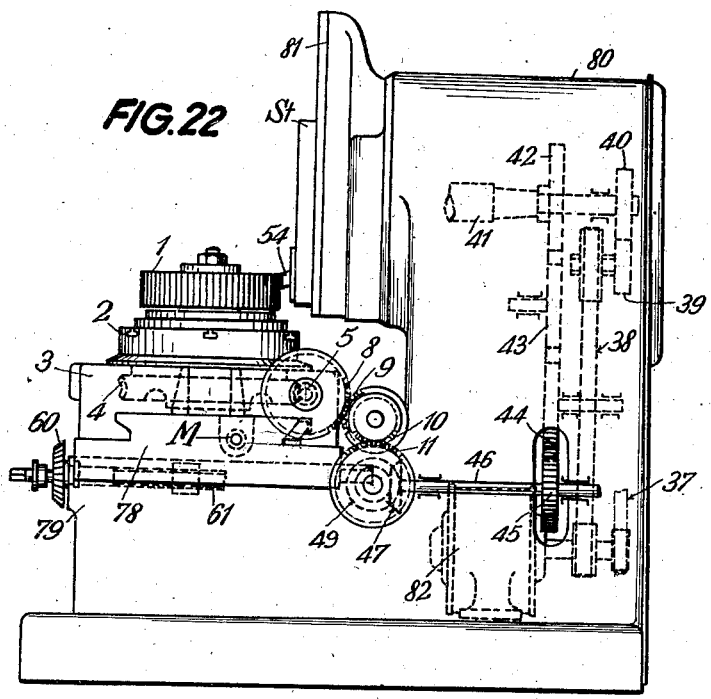
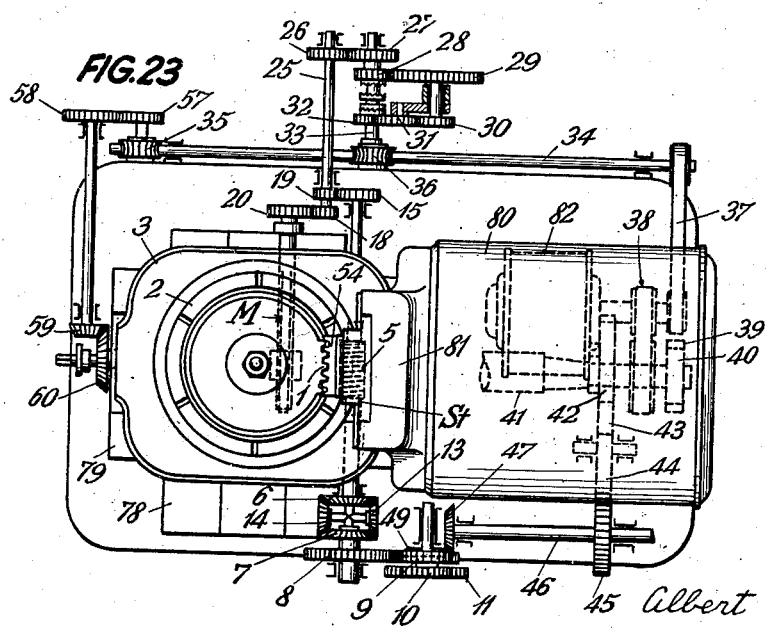
INVENTOR:
Albert Aeppli
by Sommers + Young
Attorneys Patented Jan. 14, 1947

2,414,283

UNITED STATES PATENT OFFICE 2,414,283

GEAR CUTTING MACHINE FOR SPUR AND SCREW GEARS

Albert Aeppli, Zurich, Switzerland, assignor to Maag-Zahnrader und Maschinen Aktiengesellschaft, Zurich, Switzerland Application December 6, 1944, Serial No. 566,891
In Switzerland June 21, 1943

9 Claims. (Cl. 90—8)

This invention relates to gear cutting machines for spur and screw gears, in which the work performs a continual rotating movement which results in a movement of involute relative to the tool while the tool performs a reciprocating movement so as to enter a different tooth gap after each cutting stroke.

According to the present invention the tool performs a complete cycle of reciprocating movement, while an actuating shaft performs a complete revolution, by being moved at a constant velocity by means of a cam member, which is fixed to the actuating shaft, while passing through its working path, the cam member having such a form that the rectilinear movement produced by said member is proportional to the angular range performed by the feed shaft.

This machine tool has the advantage of revolving the work continually while all the gear teeth are continually uniformly machined.

An embodiment of the invention representing a gear cutting machine is schematically illustrated by way of example only in the accompanying drawings in which Fig. 1 represents a schematic layout of the gearing arrangement of the machine;

Figs. 5 to 7 schematically exemplify a cam control actuating gearing of the tool carrier ram the control curves of which have the form of involute;

Figs. 8 to 12 schematically exemplify further constructional details of the actuating gearing of the tool carrier ram;

Fig. 14 represents an actuating gearing including a control cylinder;

Fig. 15 shows a development of this control cylinder;

Fig. 16 shows a modified construction of the cylinder control actuating gearing;

Fig. 17 shows a development of the control cylinder of Fig. 16;

Fig. 18 is a schematic view of a cam control actuating gearing including a control cam disc having a guideway of Archimedean screw form;

Fig. 19 depicts a side elevation of Fig. 18;

Figs. 20 and 21 show diagrams of working strokes illustrating the mode of producing the tooth system;

Fig. 22 shows an exemplification of the assembled machine in elevation, and

Fig. 23 is a top plan view of Fig. 22.

Figure 1:
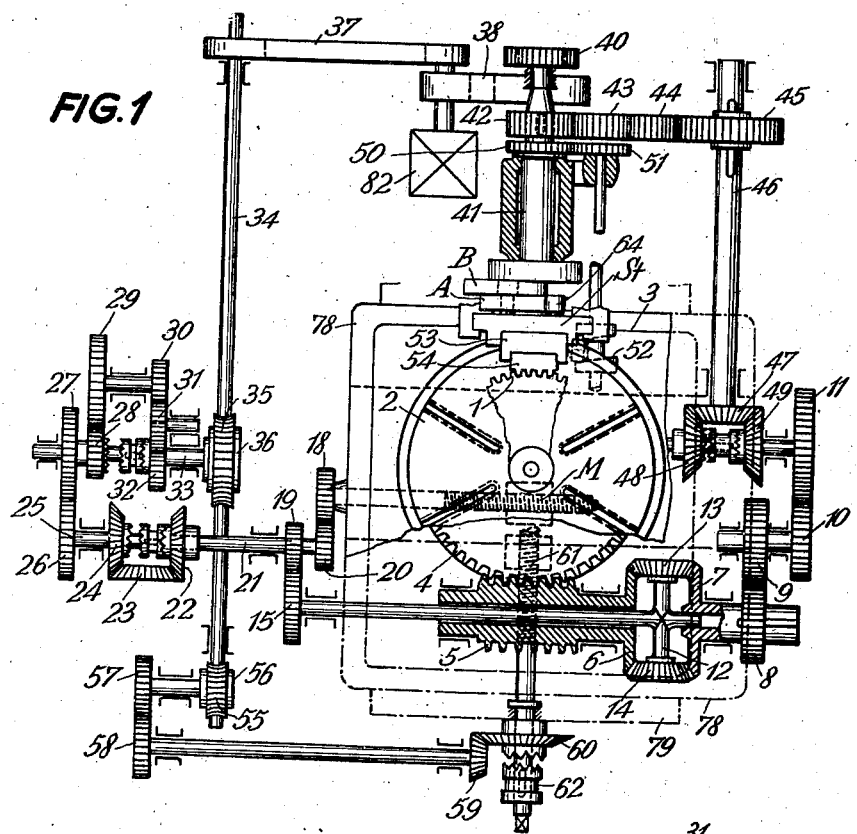

Referring to Fig. 1 of the drawings, the work 1 is clamped to a round work table 2 which is rotatably mounted in a longitudinally movable rolling slide 3. The round work table 2 is rotated through the intermediary of a dividing worm wheel 4 by means of a dividing worm 5 which is driven by a bevel wheel 6 constituting the centre gear of a differential drive the other centre gear 7 of which is connected with dividing back gears 8, 9, 10 and 11. A cross pin 12 carrying two orbital gears 13, 14 is connected with a modulus adjusting spindle M for feeding the roller slide 3 by means of modulus adjusting back gears 15, 16, 17 and 18 and associated transmission gears 19, 20.

Figure 3:
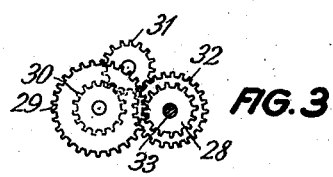
Fig. 3 is a similar view of the reversing gearing for producing the feed movement.
Figure 4:
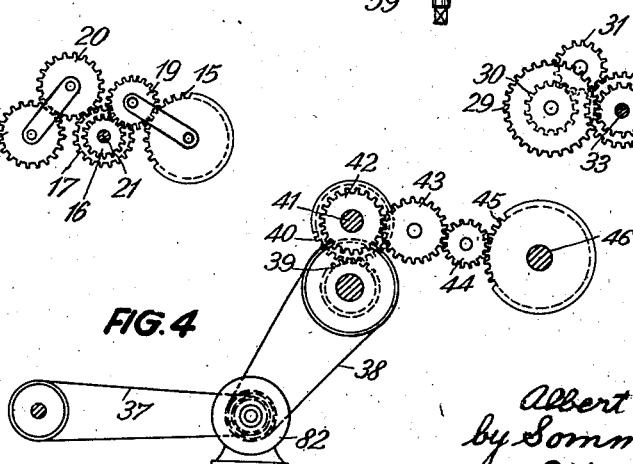
Fig. 4 is a schematic elevational view of the drive gearing of the machine.

The gears 16, 17 are mounted on a shaft 21 which is driven by means of a bevel wheel reversing drive 22, 23, 24 of a known construction. Driving motion is transmitted to this reversing drive by a shaft 25 which is connected with a shaft 33 via transverse work feed back gears 26, 27 and a reversing gearing of a known construction including gears 28, 29, 30, 31 and 32 (Fig. 3). This reversing gearing is provided with different ratios of gearing in the two possible rotational movements and is thus a ratio gearing at the same time contrary to the gearing 22, 23, 24 which is a normal reversing gearing and serves for reversing the rotational movement of the modulus adjusting spindle M so as to produce a rolling motion having the same velocity in both directions of movement.

The ratio and reversing gearing 28, 29, 30, 31 and 32 is instrumental in producing a low speed rolling motion for the working operation and a high speed return rolling motion into initial position after the gear being machined is completed. Therefore, whilst the reversing gear 22, 23, 24 need be adjusted only once in preparing the machine tool for working, the ratio and reversing gearing 28, 29, 30, 31 and 32, in cutting tooth systems out of a series of congruent gear works, is employed for producing the feed movement and the return movement for each gear work individually. The shaft 33 is driven from the feed shaft 34, which has driving movement imparted thereto by a motor 82 by means of a belt drive 37, via a worm drive 35, 36. The motor 82 drives via a belt drive 38 and gears 39, 40 a ram actuating shaft 41 which operates the ram St, for example, by means of parts such as illustrated more in detail in Figs. 5 to 7, the ram carrying a pivotal tool holder plate 53 and the tool, that is, the chasing tool 54.

The tool 54 is swung back, in a known manner, at the end of the cutting stroke, for example, by means of a cam track carrier cylinder 52 which is driven by the actuating or cam disc carrier shaft 41 via gears 50, 51. The cam disc carrier shaft 41 is connected with the dividing back gears 11, 10, 9 and 8 via gears 42, 43, 44, 45, a shaft 46 and a reversing gearing 47, 48, 49.

Alternatively, the reversing gearing 47, 48, 49 may be omitted, that is, exchanged for an ordinary bevel wheel drive if, for the reversing of the direction of rotation of the round work table 2, in the dividing reversing gearing a transmission wheel is included. Further the reversing gearing 22, 23, 24 may be dispensed with provided that in the train of gears 15, 16, 17, 18 or in the feed back gears 26, 27 a transmission gear is used for reversing the direction of rotation or such a gear is omitted. Moreover, the worm drive 5, 4 may be replaced by a spur gear drive.

The resulting total ratio of gearing between the cam disc carrier shaft 41 and the round work table 2 is so chosen that while the shaft 41 completes one revolution the table 2 advances for one or more divisions so that the steel chaser 54 cuts a different tooth gap on the completion of each stroke. If spur gears with straight or helical teeth are to be cut and thus the actuating shaft 41 and consequently also the work table 2 rotate together with the work at a constant speed of revolution the tool 54 must also be advanced on its cutting stroke at a constant velocity in the direction of the teeth of the work. In Figs. 5 to 7 and 14 to 19 the principle on which the ram drive for constant working speed operates is illustratively exemplified.

In order that the tooth flanks are given a profile of involute curvature the work must continually be passed along the teeth of the chasing tool while performing a rolling motion. This is accomplished in a known manner in that the rolling motion slide 3 is longitudinally displaced for the same amount as the work 1 is turned about its axis, that is, for the arc length of the rolling circle of the work corresponding to said amount. For coordinating said two component movements to each other the modulus adjusting back gears 15, 16, 17 and 18 are serving so that one hand the modulus adjusting spindle M and on other the cross pin 12 of the differential drive and consequently the worm drive 5, 4 of the work table 2 are rotated.

For increasing or decreasing the velocity of the rolling motion the feed back gears 26, 27 are accordingly varied. Again, for varying the frequency of strokes performed by the ram and consequently the cutting speed of the tool the ratio of gearing of the driving gears 39, 40 is varied. As the frequency of strokes of the tool increases the velocity of rolling motion may also be increased with a view to maintaining constant the number of surface cuts to be performed per tooth flank. To this end the drive of the feed shaft 34 may be derived from the shaft 46 or these two shafts may be united into one. In that event all the trains of back gears would have to be arranged on one and the same side of the machine.

The adjusting of the work 1 to the tool 54 can be effected, for example, by means of a screw spindle 61 which is mounted in the bed 79 of the machine and displaces the lower slide 78 carrying the rolling motion slide 3 and the round work table 2 (Fig. 1). This adjusting may also be effected in automatic manner by means of a bevel wheel 60 which can be coupled to the work adjusting spindle 61 by means of a clutch 62. The actuation of the bevel wheel drive 60, 59 is derived from the feed shaft 34 by means of a worm drive 55, 56 and longitudinal work feed back gears 57, 58. Alternatively, the feeding of the work may be effected by means of a cam disc as provided in the known cutting disc shaping machines.

In Fig. 5 the character A represents the involute derived by the rolling circle of diameter $a$, B the involute derived by the rolling circle of diameter $b$. The centre of these circles lies in the axis of the actuating shaft 41 (Figs. 6 and 7). The two involutes are constituted by two discs that are firmly connected to the cam disc carrier shaft 41. On a slide S rollers CA and CB are rotatably mounted (Fig. 5). The involute A contacts with the roller CA at its end point.

This involute disc has been moved out of its initial position, which is indicated by a chain-dotted involute curve A', into this end position by rotation through an angular range $\alpha$ in the direction of arrow Q.

If the slide S is guided in the direction X—X and has been moved by the involute disc into the upper end position so as to enter into contact at point E of the involute it is required that in the lower slide end position the contacting with roller CA has taken place at point H' of the involute. With the parts contacting with each other at point H' the effective length of tangent for the involute A' amounts to H'D'=the length of arc of base circle of diameter $a$ subtended by the angle $\gamma$.

In the upper end position (point of contacting E) the effective length of tangent is E—D'=the arc length of the base circle $a$ subtended by the angle $\alpha+\gamma$.

The increase in effective length of tangent which corresponds to the stroke performed by the slide while the involute disc moves from the position A' into position A amounts to ED'=D'H'+EH'=the arc length subtended by the angle $\alpha$ on the base circle of diameter $a$.

In the upper end position of the slide S the involute disc B tangents the roller CB at point K. The effective length of tangent JK corresponds to the arc length of the base circle of diameter $b$ subtended by angle $\beta$. While the involute disc revolves in the direction of arrow Q through an angular range $\beta$ the involute B moves into the chain-dotted position B' so that the end point of the involute contacts with said roller at point G. The increase in length GK of tangent corresponds to the arc length defined by angle $\beta$ on the base circle of diameter $b$. By the amount of this increase the slide S should be downwardly displaced. For the same angle $\beta$ the involute disc A should be revolved at the same time also, in order that this disc assumes position A'.

The involute B has effected the stroke GK of the slide in revolving through the angle $\beta$ while the involute A has effected the same stroke EH' in revolving through the angle $\alpha$. In the time of completion of an entire cycle of strokes the actuating shaft 41 performs one revolution by revolving through an angle of $\alpha+\beta=360°$. Further the equation $$GK=EH' \text{ or } b.\beta=a.\alpha$$

must be satisfied.

Since the angular velocity of the actuating shaft 41 is maintained constant the stroke GK effected by the involute disc B is completed quicker than the same stroke EH' being effected by the involute disc A. The proportion of the time periods amounts to $$\frac{\beta}{\alpha}=\frac{a}{b}$$

Therefore, in accordingly choosing the rolling circles of the two involute discs, an actuating gearing is obtained which completes the working stroke extending in one direction slower than the return stroke extending in the other direction.

In order to obtain a smooth reversal of movement for the tool carrier ram at the beginning and at the end of stroke, thus beyond the length of cutting stroke the respective portions of the feed disc are given a form deviating from the true involute.

In Figs. 6 and 7 a ram is shown in association with such a cam control actuating gearing. The involute discs A and B are firmly connected to the actuating shaft 41 which is rotatably mounted in a carrier 63. On the slide S driving rollers 64 are arranged. In order to be enabled to adjust the tool 54 in height the slide S is connected with the tool carrier ram St by means of a screw spindle 65 which can be rotated via a pair of bevel wheels 66, 67. On the completion of the readjustment previously described the ram St is again fixed to the slide S by means of screws 68.

Variation of the length of stroke can be effected by exchanging the involute discs used for other involute discs of other rolling circles. For small ranges of stroke requiring only a few involute discs this mode of stroke variation is appropriate contrary to machines the feed stroke of which must be variable within wide limits. In such a machine between the slide S of the involute controlled actuating gearing of constant stroke and the tool carrier ram St different ratio producing transmission means in form of levers or back gears are intercalated.

In Fig. 8 a mode of stroke variation by means of a variable leverage is schematically illustrated in which the variation of stroke is effected by shifting a support 69.

In Figs. 9 to 13 several forms of involute control actuating gearing are illustratively exemplified in which the stroke variation is effected by means of back gears. The slide S is reciprocated in a manner similar to that in which the slide S in Fig. 5 is reciprocated. In Figs. 9 to 12 the slide S is provided with lateral rack teeth 70 meshing with a gear 71. In a similar manner also the tool carrier ram St is provided with a rack 75 which meshes with a gear 74. Between the mounting shaft of the gear 74 and that of the gear 71 back gears comprising gears 72, 73 are interposed.

Figs. 9 to 12 depict several forms of arrangements of gear drives 71 to 74. For the exchange of back gears 72, 73 the arrangement shown in Fig. 12 is likely to be most advantageous. With a view to obtaining continuance of bearing engagement between the driving parts and the driven parts for effecting the ram movement, namely the involute discs and rollers, the racks and gears, the kinetic energy still inherent in the tool carrier ram at both ends of stroke is compensated, in a known manner, by spring means.

In Fig. 13 a further construction of an actuating arrangement including involute discs is depicted in which the ram instead of being actuated by means of a rack controlled gearing is actuated by means of a screw spindle. In this instance the paths of travel of the ram St and of the slide S extend at right angles to each other. The slide drives the shaft 76 via the rack drive 70, 71, the back gears 72, 73 being arranged between the shaft 76 and the screw spindle 77.

The advancing of the tool at a constant velocity can be effected as follows:

On the actuating shaft 41 (Fig. 14) is arranged, for example, a feed cylinder 83 which is provided with a groove of constant inclination throughout. As the actuating shaft 41 rotates same is displaced by means of the roller 84 which is rotatably carried by the slide S in the direction of the axis of the shaft 41. In Fig. 15 this slide movement is schematically illustrated. In this instance the feed cylinder 83 is developed in a plane, the abscisse $c$ corresponding to a whole revolution of the cylinder. During the travel through the working stroke the feed cylinder 83 moves rotatively for a stretch $a$, whereas in the slide returning the movement of the cylinder equals only the shorter stretch $b$, therefore the returning of the slide takes less time. Due to the fact that the joining line between P1 and P2 is rectilinear the slide S has imparted thereto a constant movement in the direction of the axis of ordinates as the feed cylinder rotates at a constant velocity.

The returning of the slide is effected by means of a cam piece F1 which is equidistant to the joining line between P2 and P3. With a view to simplifying the manufacture it is advantageous to arrange the actuating cam F which corresponds to the working stroke of the slide, for example, on one side of the feed cylinder 83 and the cam F1 which controls the return movement on the other side of the feed cylinder 83 (Fig. 16). In this case two driving rollers 85 are required. Fig. 17 represents the development of this feed cylinder.

For effecting the movement of constant velocity of the slide instead of a feed cylinder or an involute shaped cam disc (Fig. 5) a cam disc 86 having a guideway in the form of an Archimedean screw is employed (Fig. 18). The angle $\alpha$ (Fig. 18) corresponds to the working stroke, whereas the angle $\beta$ corresponds to the return movement of the slide S, the guide means of which must extend radially of the actuating shaft 41 and, as schematically indicated in Figs. 18 and 19, is actuated by means of a pin 87 fixed to the slide S.

The cam curve for the working stroke must come up at all times to the condition that the length of travel produced by said curve for the slide must be exactly proportional to the angular range performed by the actuating shaft 41. Further the cam curve must be provided with such a curvature which can be trimmed exactly true to form and accurately tried out for the reason that the accuracy of the teeth to be produced as regards their direction depends upon the precision with which said curve has been configurated.

In a manner similar to that described in connection with the involute controlled actuating gearing the variation of stroke can be effected also in actuating drives as shown in Figs. 14 to 19, either by exchanging the working stroke control member, the actuating cylinder 83 and the actuating disc 86, that is, in the same manner as disclosed in Figs. 6 and 7, or if the same control member is used, by intercalation of speed ratio members as described in connection with Figs. 8 to 13.

In Fig. 20 the diagram of the relative velocity of the tool relative to the cylindrical surface of rolling circle diameter of the gear to be machined is shown, that is, the diagram of relative strokes drawn to a larger scale. The rolling cylinder surface is developed into a plane and the pitch of the gear being machined and having a width $b$ amounts to $m\pi$. The divisions of the gear with straight teeth are indicated in the diagram in heavy lines. A single reciprocating movement of the tool, the working stroke and the return stroke are effected during the time $t$, during which the body rotates in an amount corresponding to a pitch $m\pi$.

The actuating gearing is so constructed that the tool moves slower during the working stroke than during the return stroke so that the working stroke requires a time $t1$ which is greater than $t2$ required for the return stroke. Between the values $t1$ and $t2$ the equation exists $$t1+t2=t$$

If $vw$ represents the rotational velocity of the work taken on the rolling circle or the velocity of relative rotation between the work and the tool the arc length $vw.t$ which the work performs during the working stroke is greater than the arc length $vw.t2$ passed through during the return stroke of the tool. By the component $vw.t1$ and the resultant R which must extend in the direction of the gear tooth the other component and the direction followed by the tool $vSt1t1$, that is, the angle $\alpha$ is determined at which the tool carrier ram is to be inclined to the gear axis.

For shaping straight teeth the ram must thus be inclinedly adjusted relative to the gear axis. The resultant R′ composed of the components $vt2$ and $vSt2t2$ is set up during the return stroke of the tool. It is, however, of no avail as the tool is relieved by the hinged plate of the tool holder during its return stroke and therefore, does not contact with the work.

In Fig. 21 a similar diagram is shown which comes into the question if a gear with oblique teeth is to be produced. In this event the ram $St$ is adjusted into the direction of the component $vSt1t1$, that is, parallel with the gear axis. Provided that the diagram is accordingly modified the gear teeth could be cut also if the ram would be inclinedly adjusted. The gear teeth must be adjusted into the direction of the resultant R (Figs. 20 and 21) in every case, that is, into the angle $\beta$ of tooth obliquity. The tool must to this end be clamped to a hinged plate 53. The relieving of the tool by means of the hinged plate at the end of stroke, however, must take place about a pivot axis which extends perpendicularly to the teeth of the chasing tool or to the teeth to be machined.

In Figs. 22, 23 the machine is shown to be completely assembled as far as the main machine parts are concerned, however, only schematically. On the bed 79 associated with the machine standard 80 the bed slide 78 is guided, so as to be displaceable by means of the screw spindle 61. The slide 78 carries the rolling motion slide 3 which is displaceable transversely of the bed guides for the bed slide in the direction of the modulus adjusting spindle M and on which the round table 2 is rotatably mounted together with the work 1. The drive of the cam disc carrier shaft 41 is derived from the motor 82 via a belt drive 38 and gears 39, 40.

Figure 2:
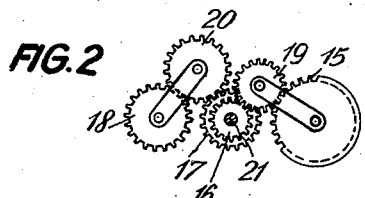
Fig. 2 is a schematic view of the modulus varying back gears.

By means of the gears 42 to 45 the driving shaft 46 of the bevel wheel drive 47, 49 is driven which rotates the dividing back gears 8 to 11, the differential drive 6, 7, 13, 14 and thus also the worm drive 5, 4 which rotates the round table 2. On the other side of the machine the modulus adjusting back gears and the feed back gears, as shown in Figs. 1 to 3, inclusive of the reversing gearing are mounted on the bed slide 3 all of which driving appliances are driven by the motor 82 by means of the feed shaft 34 and the belt drive 37. In elevation (Fig. 22) these appliances are only partly visible.

On the machine standard 80 a mounting 81 is pivotally mounted so as to be angularly adjustable and fixable, the mounting serving for receiving the tool carrier ram $St$ inclusive of the tool 54. The tool carrier ram $St$ has driving motion imparted thereto by the actuating shaft 41, for example, by elements that are shown more clearly in Figs. 5 to 13 but are not illustrated in Figs. 22 and 23.

Figs. 1, 22 and 23 and the relevant describing parts are concerned with machines in which the work carries out the rolling motion. This is merely a modified form not going beyond the scope of the invention as for the purposes of the invention all there is necessary is the setting up of relative rolling motion between the work and the tool irrespective of whether both component movements of which the rolling motion is composed are effective on the work or only one of said movements, for example the rotation about the axis, whilst the longitudinal movement is left for being effected by the tool. In the last named case, not the round table 2 but only the pivotal part 81 inclusive of the tool carrier ram would have to be mounted on a rolling motion slide.

If, however, in the instant shaping machine for gear systems instead of a chasing tool 54 a grinding disc having a profile corresponding to the profile of a tooth of said tool inclusive of the driving motor would be fastened to the pivotal plate 53, a modified gear grinding machine according to this invention would result which otherwise would operate in the same manner as the gear shaping machine described above.

I claim:

1. In a gear cutting machine for spur gear and screw gearlike works having involute gear teeth, a cutting tool, a rolling motion slide supported work table for rotating the work continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gears, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two cams fixed to said shaft, one cam for moving said tool rectilinearly through said working stroke at a constant velocity proportionate to the angular velocity of said shaft, the return cam extending through a smaller angular range of said shaft than said working cam.

2. In a gear cutting machine for spur gear and screw gearlike works having involute gear teeth, a cutting tool, a rolling motion slide supported work table for rotating the work continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gears, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two cams having involute shaped guideways fixed to said shaft, one cam for moving said tool rectilinearly through said working stroke at a constant velocity proportionate to the angular velocity of said shaft, the return cam extending through a smaller angular range of said shaft than said working cam.

3. In a gear cutting machine for spur gear and screw gearlike works having involute gear teeth, a cutting tool, a rolling motion slide supported work table for rotating the work continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gear, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two cams having involute shaped guideways fixed to said shaft, one cam for moving said tool rectilinearly through said working stroke at a constant velocity proportionate to the angular velocity of said shaft, the return cam extending through a smaller angular range of said shaft than said working cam, the base circle diameter being in principle smaller for said working cam than for said return cam.

4. In a gear cutting machine for spur gear and screw gearlike works having involute gear teeth, a cutting tool, a rolling motion slide supported work table for rotating the work continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gears, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two cams fixed to said shaft, one cam being formed by a cylinder having a cam track of constant inclination for moving said tool rectilinearly through said working stroke at a constant velocity proportionate to the angular velocity of said shaft, said working cam arranged on one end face and the return cam arranged on the other end face of said cylinder and extending through a smaller angular range of said shaft than said working cam.

5. In a gear cutting machine for spur gear and screw gearlike works having involute gear teeth, a cutting tool, a rolling motion slide supported work table for rotating the work continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gears, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two cams of Archimedean screw shape fixed to said shaft, one cam for moving said tool rectilinearly through said working stroke at a constant velocity proportionate to the angular velocity of said shaft, the return cam extending through a smaller angular range of said shaft than said working cam.

6. In a gear cutting machine for spur gear and screw gearlike works having involute gear teeth, a cutting tool, carried by a ram, a rolling motion slide supported work table for rotating the working continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gears, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two interchangeable cam means fixed to said shaft both for directly actuating said ram at various ram strokes due to cam means interchanging, one said cam means for moving said tool rectilinearly through said working stroke at a constant velocity proportionate to the angular velocity of said shaft, the effective cam portion of the return cam means extending through a smaller angular range of said shaft than the effective cam portion of said working cam means.

7. In a gear cutting machine for spur gear and screw gearlike works having involute gear teeth, a cutting tool carried by a ram, a rolling motion slide supported work table for rotating the work continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gears, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two cams fixed to said shaft both for actuating a slide for drive transmission to said ram by means of ratio gearing, one cam for moving said tool rectilinearly through said working stroke at a constant velocity proportionate to the angular velocity of said shaft, the return cam extending through a smaller angular range of said shaft than said working cam.

8. In a gear cutting machine for spur gear and screw gearlike works having involute gear teeth, a cutting tool carried by a ram, a rolling motion slide supported work table for rotating the work continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gears, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two cams fixed to said shaft both for actuating a slide, rack gearing means including transmission shafting and associated interchangeable ratio gear means intercalated between said slide and said ram, one cam for moving said tool rectilinearly through said working stroke at a constant velocity proportionate to the angular velocity of said shaft, the return cam extending through a smaller angular range of said shaft than said working cam.

9. In a gear cutting machine for spur gear and screw gearlike works having involute gear teeth, a cutting tool carried by a ram, a rolling motion slide supported work table for rotating the work continually, a modulus adjusting spindle for feeding said slide in accordance with the involute tooth form required, a rotatable actuating shaft for reciprocating said tool for performing one working and one return stroke in time with said work rotation per tooth gap of the work, a differential drive driven by said shaft through dividing back gears, one part of said drive operatively connected with said work table, the speed ratio of said back gears providing for said work table to rotate by one division at least of said work per revolution of said shaft, and another drive part positively operatively connected through modulus adjusting back gears with said spindle, and driven by separate feed means, and two cams fixed to said shaft for actuating a slide, rack gearing means operatively associated through back gear means with a screw spindle intercalated between said slide and said ram, one cam for moving said tool rectilinearly through said working stroke at a constant velocity proportionate to the angular velocity of said shaft, the return cam extending through a smaller angular range of said shaft than said working cam.

ALBERT AEPPLI.